(12) United States Patent
Li et al.

(10) Patent No.: US 8,183,496 B2
(45) Date of Patent: May 22, 2012

(54) METHOD OF FORMING A PATTERN ON A WORK PIECE, METHOD OF SHAPING A BEAM OF ELECTROMAGNETIC RADIATION FOR USE IN SAID METHOD, AND APERTURE FOR SHAPING A BEAM OF ELECTROMAGNETIC RADIATION

(75) Inventors: Yonggang Li, Chandler, AZ (US); Islam Salama, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 12/319,016

(22) Filed: Dec. 30, 2008

(65) Prior Publication Data
US 2010/0163535 A1    Jul. 1, 2010

(51) Int. Cl.
*B23K 26/36* (2006.01)
(52) U.S. Cl. ............... 219/121.6; 219/121.69; 438/800; 29/846
(58) Field of Classification Search ............ 219/121.65, 219/121.66, 121, 121.73; 438/482, 800; 29/846
See application file for complete search history.

(56) References Cited

U.S. PATENT DOCUMENTS

| 7,011,915 B2 * | 3/2006 | Nakasugi | 430/30 |
| 7,855,046 B2 * | 12/2010 | Suleski | 430/311 |
| 2007/0000884 A1 | 1/2007 | Salama | |

FOREIGN PATENT DOCUMENTS

| EP | 0030774 A1 | | 6/1981 |
| EP | 0046593 A1 | | 3/1982 |
| EP | 0479355 A1 | | 4/1992 |
| JP | 58184146 A | * | 10/1983 |
| JP | 02169193 A | * | 6/1990 |
| JP | 11077344 A | * | 3/1999 |
| WO | 00/20158 A1 | | 4/2000 |
| WO | 2010/078058 A2 | | 7/2010 |
| WO | 2010/078058 A3 | | 9/2010 |

OTHER PUBLICATIONS

Jomaa, Houssam Houssam, et al., "Routing Layer for a Microelectronic Device, Microelectronic Package Containing Same, and Method of Forming a Multi-Thickness Conductor in Same for a Microelectronic Device"; U.S. Appl. No. 11/957,454, filed Dec. 15, 2007.

(Continued)

*Primary Examiner* — Samuel M Heinrich
(74) *Attorney, Agent, or Firm* — Kenneth A. Nelson (57) ABSTRACT

A method of forming a pattern (700) on a work piece (1260) includes placing a pattern mask (1210) over the work piece, placing an aperture (100, 500, 600, 1220) over the pattern mask, and placing the work piece in a beam of electromagnetic radiation (1240). The aperture includes three adjacent sections. A first section (310) has a first side (311), a second side (312), and a first length (313). A second section (320) has a third side (321) adjacent to the second side, a fourth side (322), a second length (323), and a first width (324). A third section (330) has a fifth side (331) adjacent to the fourth side, a sixth side (332), and a third length (333). The first and third lengths are substantially equal. The first and third sections are complementary shapes, as defined herein.

20 Claims, 7 Drawing Sheets

OTHER PUBLICATIONS

International Search Report and Written Opinion Received for PCT Patent Application No. PCT/US2009/068578, mailed on Aug. 3, 2010, 8 pages.

International Preliminary Report on Patentability received for PCT Patent Application No. PCT/US2009/068578, mailed on Jul. 14, 2011, 5 pages.

* cited by examiner

METHOD OF FORMING A PATTERN ON A WORK PIECE, METHOD OF SHAPING A BEAM OF ELECTROMAGNETIC RADIATION FOR USE IN SAID METHOD, AND APERTURE FOR SHAPING A BEAM OF ELECTROMAGNETIC RADIATION

FIELD OF THE INVENTION

The disclosed embodiments of the invention relate generally to the formation of feature patterns in microelectronic devices, and relate more particularly to pattern stitching in work piece pattern formation.

BACKGROUND OF THE INVENTION

Microelectronic devices rely on intricate patterns of electrically conductive traces and other features to achieve proper performance. Typically, the creation of such patterns involves the formation of trenches (later filled in) within a dielectric material. Such trenches may be formed, for example, by a process called laser ablation patterning in which a laser beam is used to ablate a desired pattern in the dielectric material.

Laser projection patterning (LPP) is one version of laser ablation patterning. In LPP, a synchronous scan ablation technique is preferred over a stepwise ablation technique. In a synchronous scan scheme the laser beam irradiates a pattern mask and is projected onto the work piece through projection optics having a certain magnification or demagnification ratio. The mask and the work piece are typically mounted on separate motion stages and move in opposite directions. While they move, a rectangular laser beam scans across the mask and the work piece to form a pattern strip with a length equal to the length of the rectangular beam.

A relatively high energy density is required in order to successfully ablate the dielectric material and form the pattern, thus limiting laser beam size to a degree that large area patterning is not possible without stitching together multiple sub-patterns. The ever-shrinking feature size of packaging substrates demands extremely high positioning accuracy for pattern stitching.

BRIEF DESCRIPTION OF THE DRAWINGS

The disclosed embodiments will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, a method of forming a pattern on a work piece comprises placing a pattern mask over the work piece, placing an aperture over the pattern mask, and placing the aperture, the pattern mask, and the work piece in a beam of electromagnetic radiation. The aperture comprises three adjacent sections. A first section has a first side, an opposing second side, and a first length. A second section has a third side adjacent to the second side, an opposing fourth side, a second length, and a first width. A third section has a fifth side adjacent to the fourth side, an opposing sixth side, and a third length. The first length and the third length are substantially equal to each other. The first section and the third section are complementary shapes, as defined herein.

As was mentioned above, the ever-shrinking feature sizes of microelectronic devices demand an extremely high level of accuracy for pattern stitching. Conventional stitching is very complicated and requires the use of costly precision motion systems. Because embodiments of the invention are intrinsically tolerant to positioning inaccuracies, the requirements for motion system precision are significantly relaxed. The complexity and cost of the motion system that is needed are also significantly reduced.

As will be described in detail below, embodiments of the invention use particular beam shapes and a controlled overlapping stitching region in order to enable the seamless stitching of multiple sub-patterns into a desired larger feature pattern. The use of laser ablation patterning to pattern a work piece of any size without being limited by the laser energy budget is thus made possible. In certain embodiments, as will be explained, the special beam shape allows seamless patterning in the overlapped region by complementary, additive laser ablation.

Figure 1:
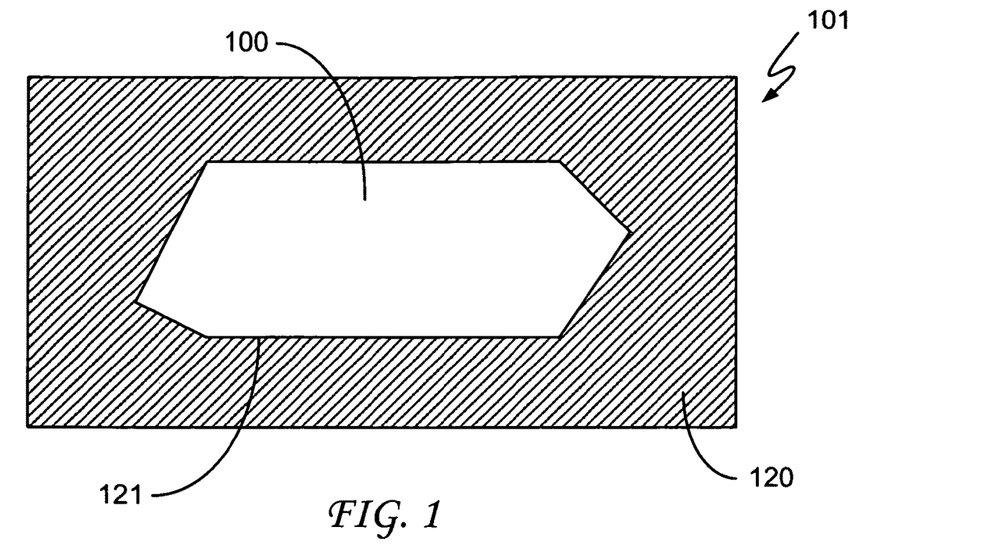
FIG. 1 is a plan view of an aperture within a template according to an embodiment of the invention.
Figure 2:
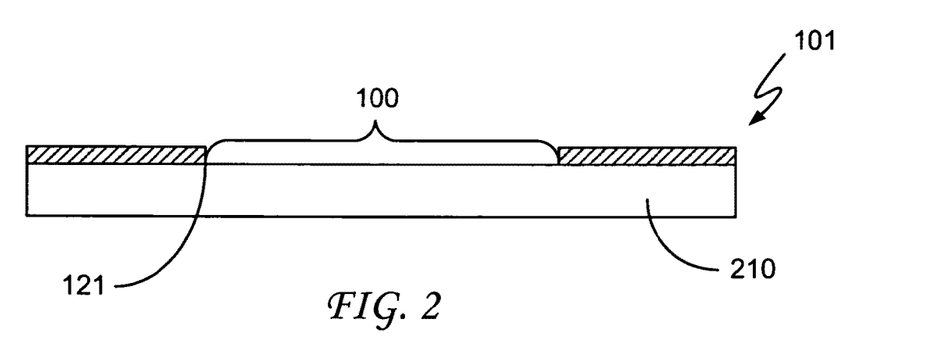
FIG. 2 is a cross-sectional view of the aperture and template of FIG. 1.

Referring now to the drawings, FIG. 1 is a plan view and FIG. 2 is a cross-sectional view of an aperture 100 within a template 101 according to an embodiment of the invention. As an example, aperture 100 is suitable for shaping a beam of electromagnetic radiation. As illustrated in FIGS. 1 and 2, aperture 100 is contained within a template 101 that comprises a transparent material 210 and a metal overlay 120. As an example, transparent material 210 can be a layer of glass or the like that is partially covered by metal overlay 120. An opening 121 in metal overlay 120 forms a window in transparent material 210, and this window is aperture 100. Metal overlay 120 can be made of chromium, aluminum, gold, or any other suitable metal.

Figure 3:
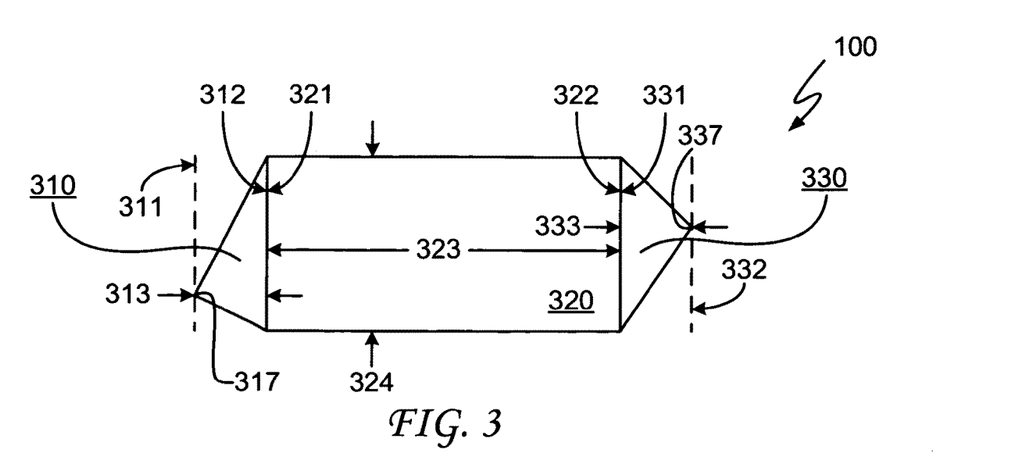
FIGS. 3 and 4 are plan views of the aperture of FIG. 1 according to an embodiment of the invention.
Figure 4:
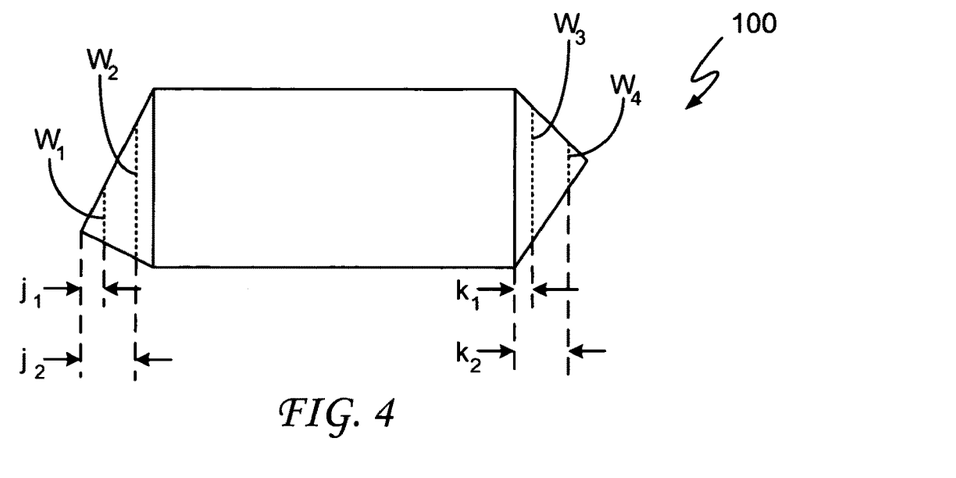

FIGS. 3 and 4 are plan views of aperture 100 according to an embodiment of the invention, and a more detailed description of aperture 100 will now be set forth with reference to both FIGS. 3 and 4. In order to enhance the clarity of the illustration, some of the reference numerals that appear in FIG. 3 are omitted from FIG. 4, and vice versa. As illustrated, aperture 100 comprises a section 310 having a side 311, an opposing side 312, and a length 313 that is a shortest distance between sides 311 and 312. Note that in the illustrated embodiment section 310 is a triangle having an apex 317 at side 311, but other configurations are also possible, as will be described below. Aperture 100 further comprises a section 320 having a side 321, an opposing side 322, a length 323 that is a shortest distance between sides 321 and 322, and a width 324 that is substantially constant along all of length 323. (This means, for at least the illustrated embodiment, that section 320 has a rectangular shape.) As shown, side 321 of section 320 is adjacent to, here meaning collinear with, side 312 of section 310. Aperture 100 still further comprises a section 330 having a side 331, an opposing side 332, and a length 333 that is a shortest distance between sides 331 and 332. Lengths 333 and 313 are substantially equal to each other. Side 331 of section 330 is adjacent to, here again meaning collinear with, side 322 of section 320. Note that in the illustrated embodiment section 330, like section 310, is a triangle having an apex 337 at side 332.

As made clear in the figures, the widths of sections 310 and 330 vary along their lengths. This is perhaps best illustrated in FIG. 4 where it is shown that section 310 has a width $W_1$ at a point that is offset from side 311 (see FIG. 3) by an amount $j_1$ and a (larger) width $W_2$ at a point that is offset from side 311 by an amount $j_2$. More generally, at a distance J from side 311, section 310 has a width $W_j$. Similarly, section 330 has a width $W_3$ at a point that is offset from side 331 (see FIG. 3) by an amount $k_1$ and a (smaller) width $W_4$ at a point that is offset from side 331 by an amount $k_2$. More generally, at a distance K from side 331, section 330 has a width $W_k$. It may be seen that offset amounts J and K vary between zero and the magnitude of length 313. (Recall from above that length 333 is substantially equal to length 313.) It is a condition of aperture 100 that for J=K, $W_j+W_k$ is equal to width 324. In other words, a width of section 310 at a point that is offset from side 311 by a first offset amount plus a width of section 330 at a point that is offset from side 331 by the same offset amount is equal to the width of section 320 (i.e., width 324) for all values of the first offset amount. The word "complementary" is used herein to identify sections or shapes for which the foregoing condition is true.

Aperture 100 is one example of an aperture comprising such complementary sections. Apertures 500 and 600, depicted in FIGS. 5 and 6, respectively, are illustrative of other apertures that comprise complementary sections. (Apertures 500 and 600 each have three (unlabeled) sections that correspond to sections 310, 320, and 330 of aperture 100, and sides, lengths, and other features of each section are similar to corresponding features of corresponding sections in aperture 100.) Depicted in both FIGS. 5 and 6 is a line $W_1$ representing a width of the aperture at an offset $j_1$ and a line $W_2$ representing a width of the aperture at an offset $k_1$.

Figure 5:
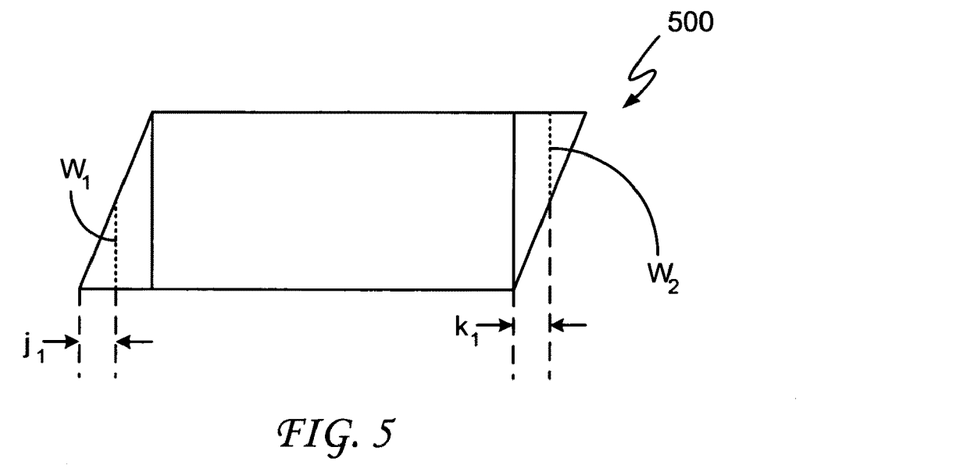
FIGS. 5 and 6 are plan views of apertures according to other embodiments of the invention.
Figure 6:
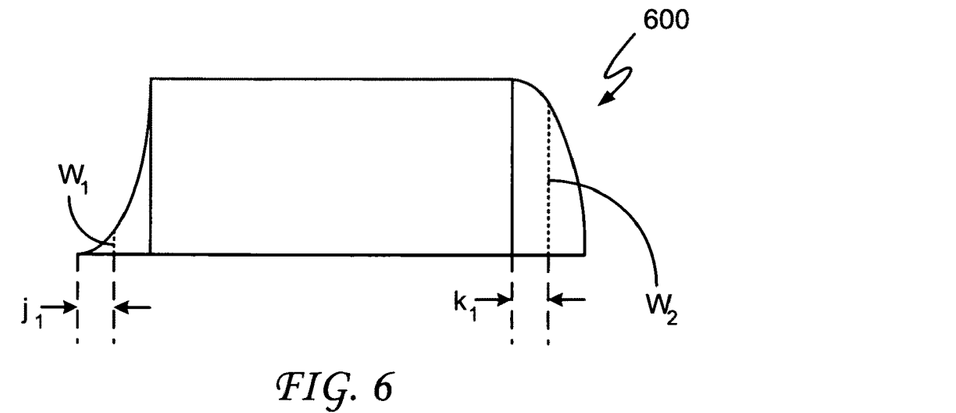

A comparison of FIG. 3 (or 4) and 5 will show that section 310 and the corresponding section of aperture 500 are both triangles with an apex on line 311 (or the corresponding line in FIG. 5) and that section 330 and the corresponding section of aperture 500 are also both triangles with an apex on line 332 (or the corresponding line in FIG. 5). Sections 310 and 330 are complementary sections and so are their counterparts in aperture 500. From this it may be extrapolated that sections 310 and 330 would be complementary shapes regardless of the location of apex 317 and apex 337 as long as apexes 317 and 337 were located at some point along sides 311 and 331, respectively. In other words, any two triangular shapes having equal bases and equal heights will be complementary in the sense set forth above. (To ensure that the foregoing terminology is clear, it should be stated that the base of section 310 is line 312, the base of section 330 is line 331, the height of section 310 is length 313 and the height of section 330 is length 333. It should be further stated that sections may be complementary without being triangles, a fact that is shown, for example, by FIG. 6.)

Apertures such as those depicted in FIGS. 1-6 may be used, according to embodiments of the invention, to create feature patterns in microelectronic and other devices. To that end, the aperture may be irradiated with a laser beam or another beam of electromagnetic radiation having an intensity sufficient to ablate an underlying material. In one embodiment, an intensity at the work piece of approximately 1 Joule per square centimeter ($J/cm^2$) may be sufficient. The laser beam, which after passing through the aperture has the same shape as the aperture, creates tapered side walls with identical profile as the laser beam scans perpendicularly. The laser energy distribution is uniform over the entire cross-sectional area. The ablation depth is proportional to the laser dwell time, which in turn is proportional to the beam width along the length of the beam. More specifically, the ablation depth corresponding to the second section of the aperture (320) is equal to the target ablation depth which, in one embodiment, is in the range of 10-30 micrometers (hereinafter "microns," or "μm") while the ablation depth reduces continuously at the two side sections (310 and 330) as it moves away from section 320. The ablation depth varies from full ablation depth to zero going from the base of the side sections (312 of section 210 and 331 of section 330) to the apex (313 of section 210 and 332 of section 330), forming a slope at both sides of the beam. Given a typical 1:20 slope as an example, and a target ablation depth of approximately 10-30 μm, the height of the side sections (corresponding to lengths 313 and 333) can be, in that embodiment, approximately 200-600 μm.

Figure 7:
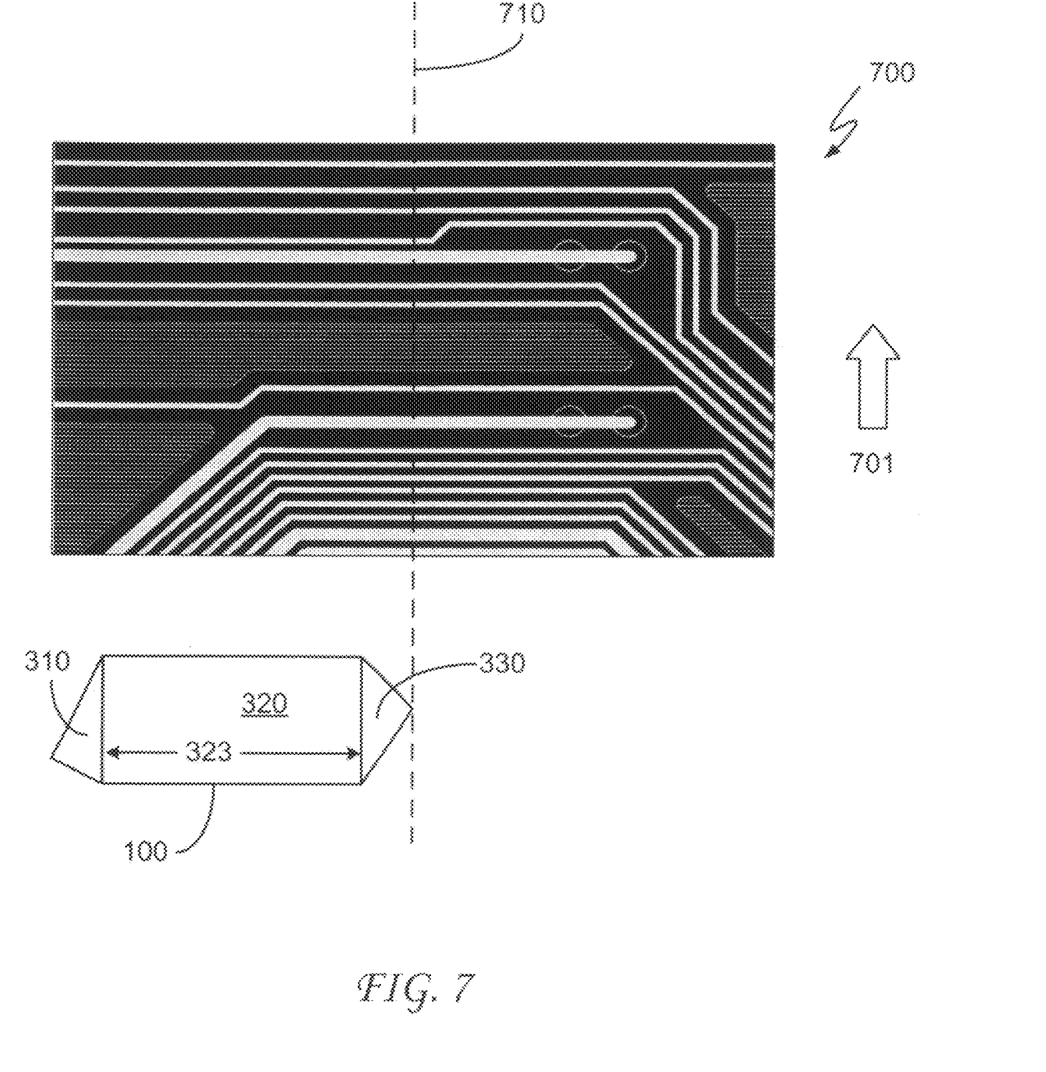
FIG. 7 is a plan view of an exemplary trace pattern that may be formed according to an embodiment of the invention.

It was mentioned above that trace patterns and other feature patterns to be formed on substrates of microelectronic devices are often so large that they may not be formed in a single pass of the laser beam. This is depicted in FIG. 7, which is a plan view of an exemplary trace pattern 700 that may be formed according to an embodiment of the invention. In order to create the pattern, appropriate regions of work piece material are ablated, in one embodiment, by causing a laser beam to move across trace pattern 700 in the direction of an arrow 701. (Alternatively, trace pattern 700 may be caused to move in the opposite direction underneath the laser beam.) As this happens, the laser beam carves out a trench having a depth that is everywhere proportional to the laser dwell time, which in turn is proportional to the beam width along the length of the beam as mentioned above.

An outline of aperture 100 in FIG. 7 indicates that trace pattern 700 is too large to be created in a single pass of the laser beam. Trace pattern 700 must therefore be created using multiple laser beam sweeps in which, for reasons that will be explained below, each sweep ablates the appropriate material along a strip or region of the work piece that is as wide as the total length of aperture 100. These regions must be stitched together, meaning that the trailing edge of a particular region must be precisely aligned with the leading edge of the preceding region in order to create a seamless pattern. As was discussed above, the feature sizes of microelectronic devices are such that an extremely high level of precision for pattern stitching is required. Referring still to FIG. 7, a first region, comprising the portion of trace pattern 700 located to the left of a line 710, would need to be stitched to a second region, comprising the portion of trace pattern 700 located to the right of line 710.

Figure 8A:
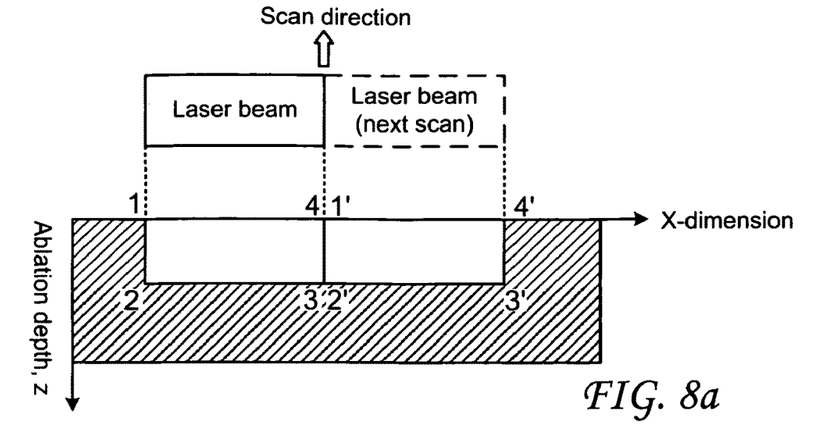
FIGS. 8*a-c* are cross-sectional views of possible outcomes of pattern stitching when a conventional laser beam is used.
Figure 8B:
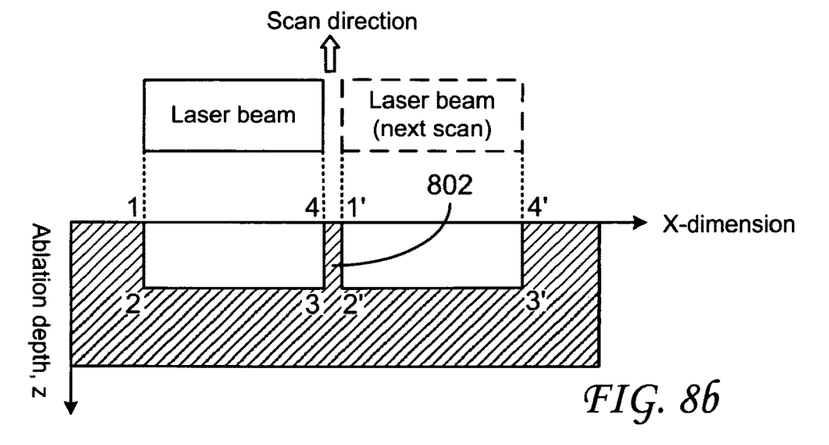
Figure 8C:
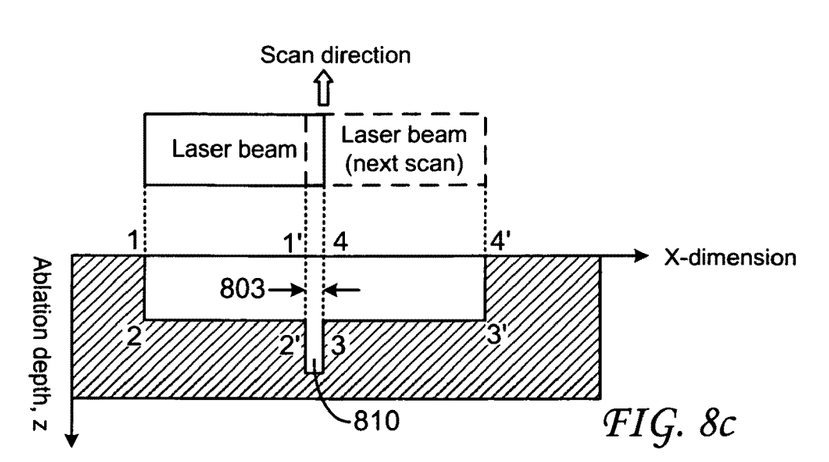

In practice, the required precision is nearly impossible to achieve using a conventional rectangular laser beam that makes an ablation pattern with substantially straight sidewalls. The difficulty is illustrated in FIGS. 8a, 8b, and 8c. In FIG. 8a, the two regions (rectangles 1234 and 1'2'3'4') are formed in two successive sweeps of the laser beam. Here pattern stitching has been achieved by exactly aligning line 1'-2' with line 3-4. FIG. 8a thus illustrates the ideal case.

More typically, pattern stitching with a rectangular beam results in a situation such as those shown in FIGS. 8b and 8c where successive sweeps were not perfectly aligned. In FIG. 8b the two sweeps are separated by a pillar 802 resulting from a positive positioning error in the x-dimension. The presence of pillar 802 means that the two regions are separated from each other. Any such separation, even if very small, will cause an electrical open for all features that span the two regions, i.e., all features that have sections in both regions. In FIG. 8c, the two sweeps were interposed with an overlap 803 resulting from a negative positioning error in the x-dimension. (Note that the x- and z-dimensions are on different scales.) Within the boundaries of overlap 803 the work piece will be ablated twice as much as desired, leaving a feature 810 that is significantly deeper than the target. This may cause layer-to-layer electrical shorting, early reliability failures, and the like.

Figure 9A:
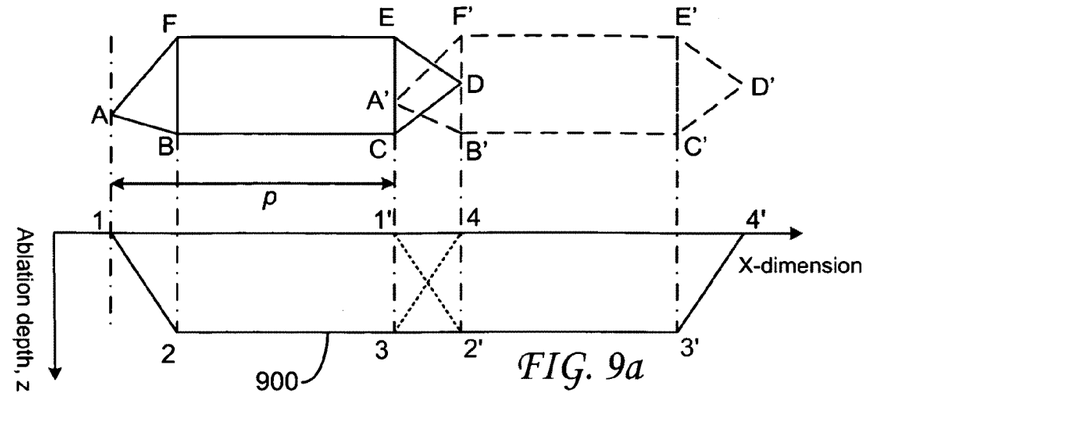
FIGS. 9*a-c* are cross-sectional views of an exemplary trench created by laser ablation through an aperture according to an embodiment of the invention.
Figure 9B:
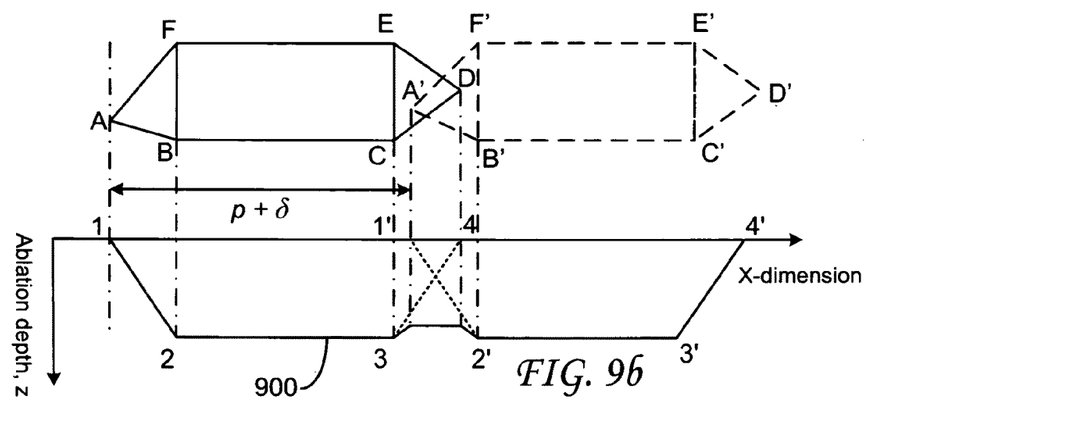
Figure 9C:
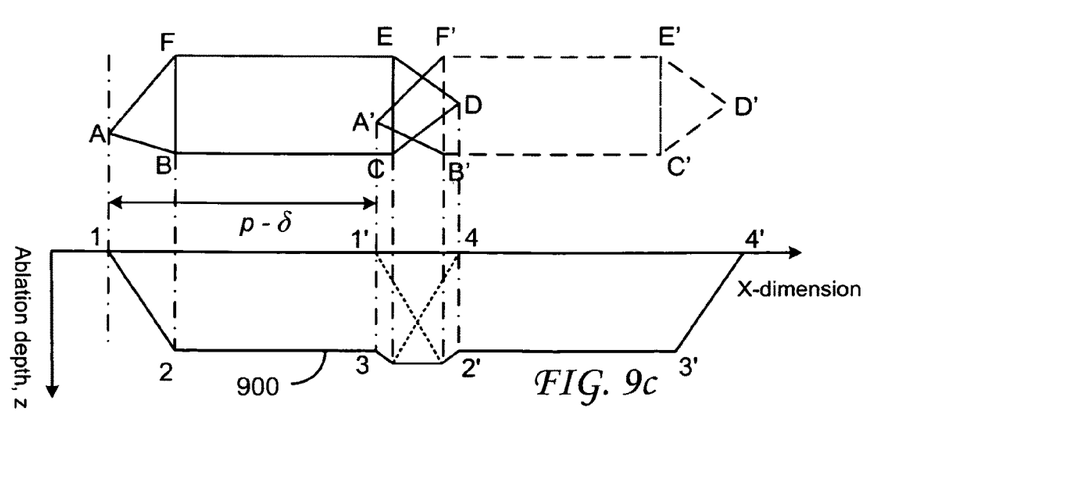

The foregoing stitching difficulties and positioning errors may be overcome by using a beam of electromagnetic radiation shaped by an aperture according to an embodiment of the invention. One such embodiment is illustrated in FIGS. 9a-c, which are cross-sectional views of an exemplary trench 900 created by laser ablation through an aperture such as those described herein according to embodiments of the invention. (Note that for FIGS. 9a-c, as for FIGS. 8a-c, the x- and z-dimensions are on different scales.)

A laser beam having the shape of (i.e., a laser beam shaped by) an aperture such as those disclosed herein creates tapered side walls instead of vertical sidewalls. The tapered sidewalls significantly minimize or even eliminate the negative effects of positioning errors during pattern stitching by allowing significantly higher tolerance to positioning inaccuracy compared to a conventional rectangular beam.

FIG. 9a depicts the ideal case in which trench 900 has been patterned, once again in two separate sweeps of a laser beam, with no positioning error. In the context of FIG. 9a this means that on the second sweep apex A' is aligned with line C-E. As shown, this corresponds to an offset p for consecutive beam sweeps. In this ideal case the side wall created by section ABF exactly aligns with that created by shape CDE. The reversely tapered profiles add up to a uniform ablation depth that equals the depth of section BCEF. Note that p is equal to the length of section ABF plus the length of section BCEF. In the language of FIG. 3, p=length 313+length 323.

During the first sweep, the laser beam carves out shape 1234, which forms part of trench 900. Note the diagonal line 3-4 that is tapered from full depth at 3 to essentially no depth at 4. This is an example of the tapered sidewalls under discussion here. The full depth at 3 occurs because the aperture has its full width at line C-E and so the dwell time of the laser there is at a maximum. To the right of line C-E, however, the aperture begins to narrow until it terminates at apex D, where the width of the aperture, and hence the dwell time of the laser, are at a minimum. This leads to the minimal (or zero) depth at 4. During the second sweep, the laser beam carves out adjoining shape 1'2'3'4'. Note here that diagonal line 1'-2' is the inverse of diagonal line 3-4 so that in region 1'32'4 the second sweep ablates what was left unablated during the first sweep. It should be understood that this occurs because ABF and CDE are complementary shapes in the sense discussed above.

It should be understood that the first sweep referred to in the preceding paragraph is not the initial sweep experienced by the work piece. If it were, as an examination of FIG. 9a will show, the left-hand tapered sidewall of shape 1234 would remain only half ablated because the initial beam sweep is the only one that ever touches that area, which is on the extreme left side of the work piece. The same thing is true for the extreme right side of the work piece, which is also only swept over by one beam sweep. To account for these issues, the initial beam sweep for a given work piece is performed with section ABF and a small adjoining portion of section BCEF (refer again to FIG. 9a) blocked by the pattern mask. Similarly, the final beam sweep for a given work piece is performed with section CDE and a small adjoining portion of section BCEF (refer again to FIG. 9a) blocked by the pattern mask. On the other hand, for the first sweep depicted by FIG. 9a, which, again, is not the initial sweep, it will be understood that the left-hand tapered sidewall of section 1234 has already been partially ablated in a preceding beam sweep.

Under-ablation will occur if the beam offset is slightly greater than p. This is illustrated in FIG. 9b where the offset is p+δ. As mentioned above, positioning errors such as this are very common. Any resulting detrimental effects, however, will be minimal—or non-existent—because the gradually tapered sidewalls of the aperture minimize ablation errors. Existing motion systems can easily maintain the positioning error δ below a few microns, which is much smaller than the width of the side taper. The serious issue of separation illustrated by FIG. 8b is completely eliminated when an aperture such as those disclosed herein is used.

Over-ablation will occur when the beam offset is slightly shorter than p. This is illustrated in FIG. 9c where the offset is p–δ. These sorts of positioning errors are also very common. Once again, however, any resulting detrimental effects will be minimal or non-existent due to the slowly tapered side walls, and the possibility of layer-to-layer electrical shorting and the like as illustrated by FIG. 8c is completely eliminated.

Figure 10:
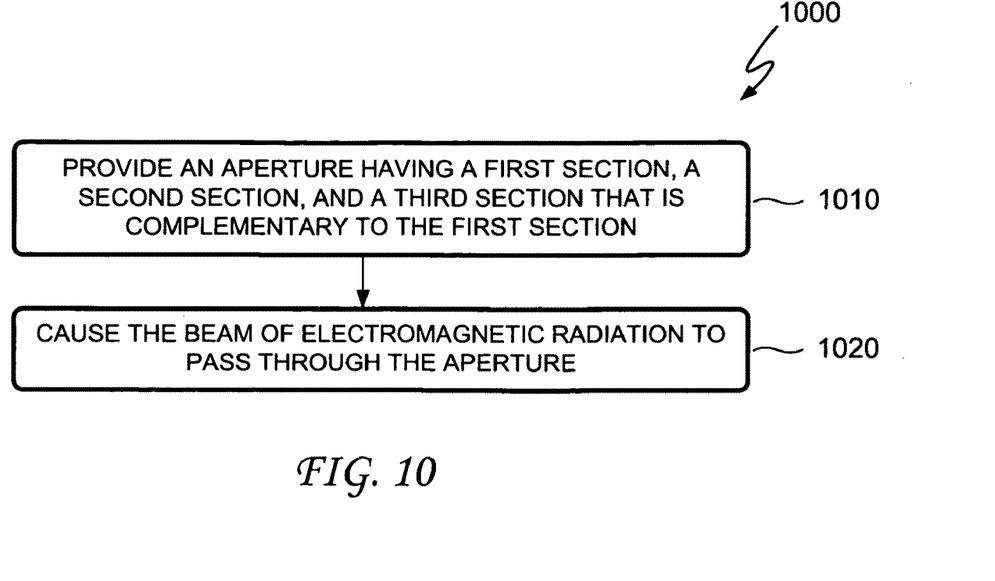
FIG. 10 is a flowchart illustrating a method of shaping a beam of electromagnetic radiation according to an embodiment of the invention.

FIG. 10 is a flowchart illustrating a method 1000 of shaping a beam of electromagnetic radiation according to an embodiment of the invention. As an example, method 1000 may result in the formation of a beam suitable for forming a trench that is similar to trench 900 that is shown in FIGS. 9a-c.

A step 1010 of method 1000 is to provide an aperture having a first section, a second section, and a third section that is complementary to the first section. As an example, the aperture can be similar to apertures 100 (first shown in FIG. 1), 500 (shown in FIG. 5), 600 (shown in FIG. 6), or another aperture disclosed herein. Accordingly, step 1010 is to provide an aperture comprising: a first section having a first side, an opposing second side, and a first length; a second section having a third side adjacent to the second side of the first section, an opposing fourth side, a second length, and a first width; and a third section having a fifth side adjacent to the fourth side of the second section, an opposing sixth side, and a third length (which is substantially equal to the first width). As an example, the first section, the first side, the second side, the first length, the second section, the third side, the fourth side, the second length, the first width, the third section, the fifth side, the sixth side, and the third length can be similar to, respectively, section 310, side 311, side 312, length 313, section 320, side 321, side 322, length 323, width 324, section 330, side 331, side 332, and length 333, all of which are shown in FIG. 3.

For clarity, and for the convenience of the reader, it is reiterated here that in order for the first and third sections to be complementary sections, a width of the first section at a point that is offset from the first side by a first offset amount (which offset amount varies between zero and a magnitude of the first length) plus a width of the third section at a point that is offset from the fifth side by the first offset amount is equal to the first width for all values of the first offset amount.

A step 1020 of method 1000 is to cause the beam of electromagnetic radiation to pass through the aperture. As has been explained, this causes the beam to take the shape of the aperture, thus enabling the ablation and pattern stitching advantages discussed herein.

Figure 11:
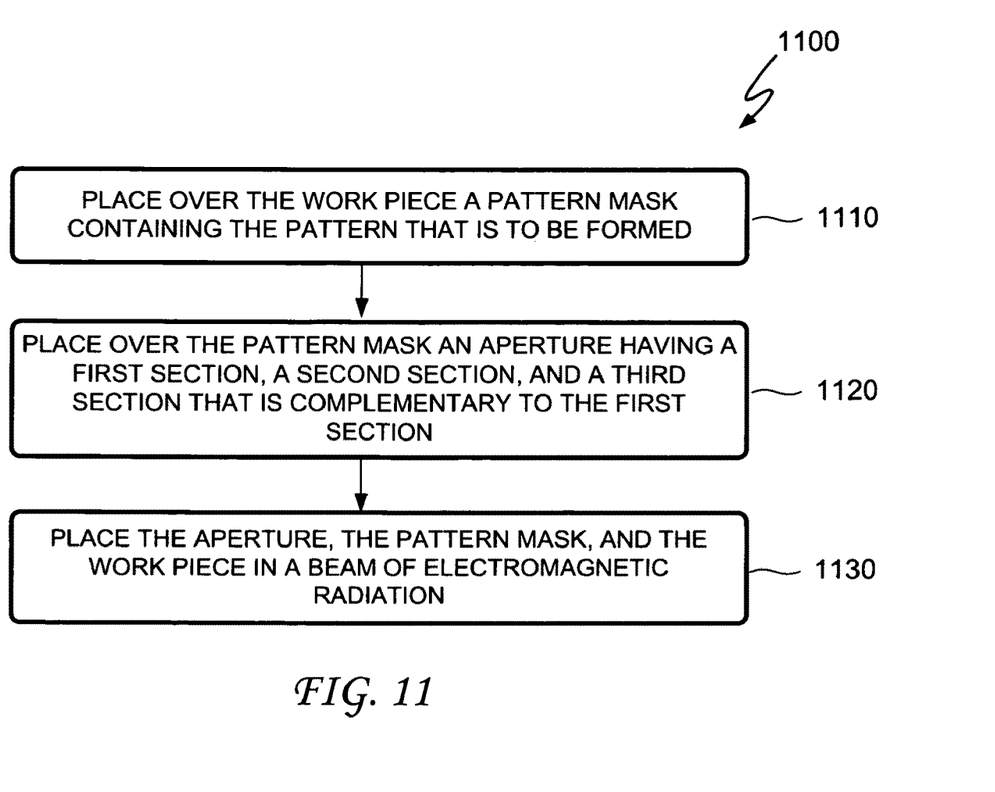
FIG. 11 is a flowchart illustrating a method of forming a pattern on a work piece according to an embodiment of the invention.

FIG. 11 is a flowchart illustrating a method 1100 of forming a pattern on a work piece according to an embodiment of the invention. As an example, method 1100 may form a trace pattern or another feature pattern on a substrate of a microelectronic device. As another example, the trace pattern can be similar to trace pattern 700 that is shown in FIG. 7.

A step 1110 of method 1100 is to place over the work piece a pattern mask containing the pattern that is to be formed. As is known in the art, the pattern mask acts as a template for the formation of the pattern. As an example, if trace pattern 700 of FIG. 7 is to be formed then FIG. 7 would be a good representation of how the pattern mask itself would appear. As another example, the pattern mask can be similar to a pattern mask 1210, shown schematically in FIG. 12 which is a schematic representation of an ablation setup 1200 according to an embodiment of the invention.

Figure 12:
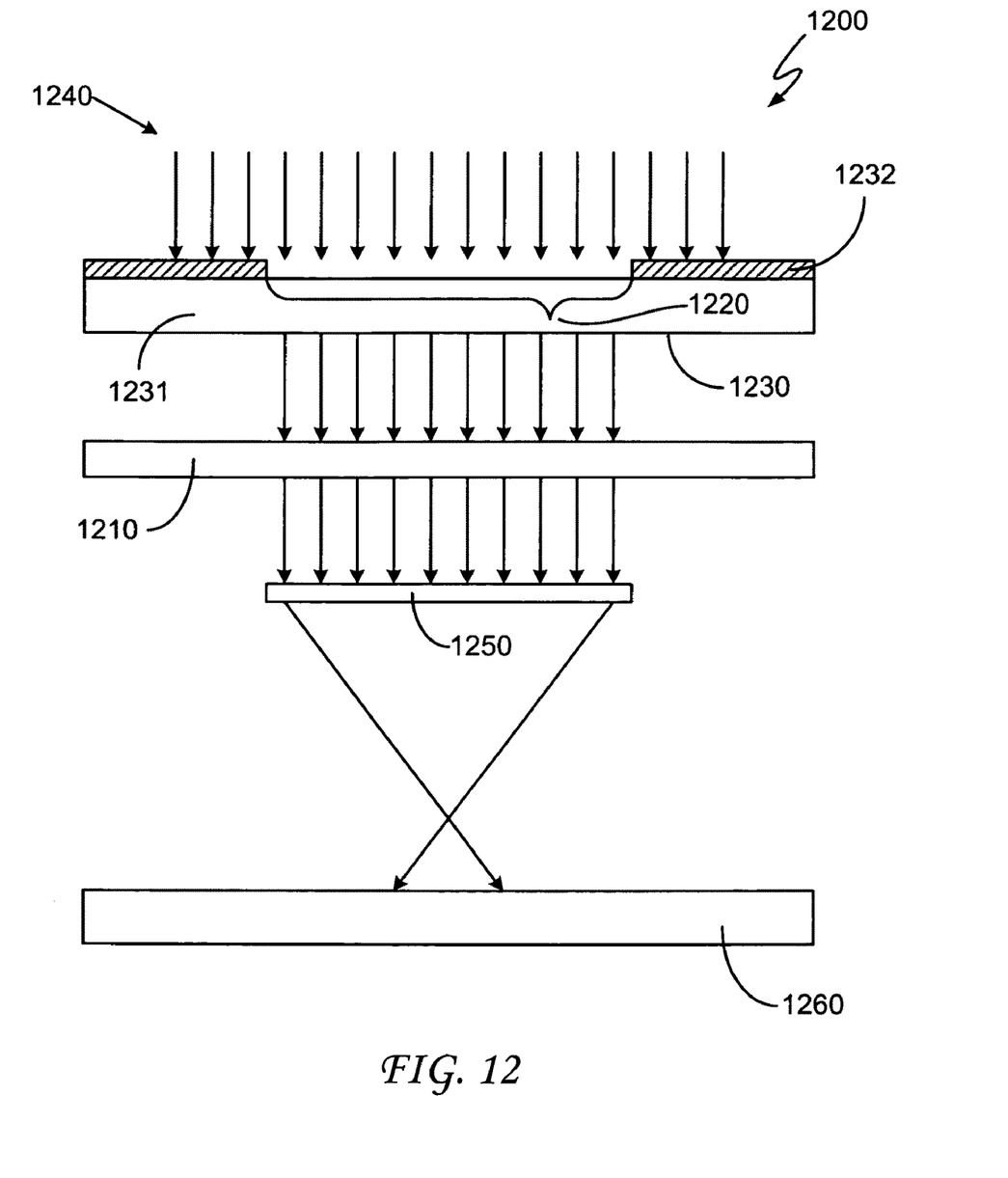
FIG. 12 is a schematic representation of an ablation setup according to an embodiment of the invention.

A step 1120 of method 1100 is to place over the pattern mask an aperture having a first section, a second section, and a third section that is complementary to the first section. As an example, the aperture can be similar to aperture 100, first shown in FIG. 1, aperture 500, shown in FIG. 5, or aperture 600, shown in FIG. 6. As another example, the aperture can be similar to an aperture 1220 that is shown in FIG. 12. Also illustrated in FIG. 12 is a template 1230 that contains aperture 1220 and further comprises a transparent material 1231 and a metal overlay 1232. As an example, template 1230, transparent material 1231 and metal overlay 1232 can be similar to, respectively, template 101, transparent material 210, and metal overlay 120, all of which are shown in FIG. 2.

A step 1130 of method 1100 is to place the aperture, the pattern mask, and the work piece in a beam of electromagnetic radiation. An example of this is shown in FIG. 12, where template 1230 (containing aperture 1220) and pattern mask 1210 are placed in a beam 1240 of electromagnetic radiation. As an example, beam 1240 can be a laser beam or the like. After passing through aperture 1220 and pattern mask 1210, beam 1240 passes through projection optics 1250 which images the pattern of mask 1210 onto a work piece 1260, where beam 1240 carries out the desired ablation and forms the desired pattern.

In one embodiment, the pattern is made up of a plurality of regions, each of which has a length substantially equal to the sum of the first length and the second length. In the same or another embodiment, step 1130 comprises positioning the aperture, the pattern mask, and the work piece such that only a first portion of the work piece passes through the laser beam in a first ablating event and only a second portion of the work piece passes through the laser beam in a second ablating event. As an example, the first ablating event can be a first sweep of the laser beam—one that passes over a first strip of the work piece—and the second ablating event can be a second sweep of the laser beam that passes over a second, adjacent strip of the work piece. Here, reference may be made to FIG. 7, where a first ablating event may comprise a laser beam sweep that creates (or partially creates) the portion of trace pattern 700 located to the left of line 710 and a second ablating event may comprise a laser beam sweep that creates (or partially creates) the portion of trace pattern 700 located to the right of line 710.

In the embodiment discussed in the preceding paragraph, or in another embodiment, the first portion of the work piece comprises all of a first one of the plurality of regions making up the pattern and a section of a second one of the plurality of pattern regions. This may be understood by referring to, for example, FIGS. 9a-c and the accompanying discussion where it is demonstrated that certain sections of an ablation pattern are partially formed in a first laser beam sweep (here called an ablation event) and finished in a second ablation event. So, for example, the section of the second one of the plurality of regions is partially formed in a first sweep or ablation event by a laser beam passing through a first section of an aperture and completed in a second sweep or ablation event by the laser beam passing through a second, complementary section of the aperture. As also discussed in connection with FIGS. 9a-c, the section of the second one of the plurality of regions has a length equal to the first length plus an offset (referred to in FIGS. 9b and 9c as δ). The offset can vary up to the first length before problems such as electrical opens and layer-to-layer electrical shorts become an issue. As the first length can be in the range of a few hundred microns while existing positioning apparatus are accurate to within a few microns, the possibility of these issues arising is rather remote when apertures according to embodiments of the invention are used.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the apertures for shaping a beam of electromagnetic radiation and the related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An aperture for shaping a beam of electromagnetic radiation, the aperture comprising:
    a first section having a first side, an opposing second side, and a first length, the first length being a shortest distance between the first side and the second side;
    a second section having a third side, an opposing fourth side, a second length, and a first width, the second length being a shortest distance between the third side and the fourth side, the first width being substantially constant along all of the second length, and the third side being adjacent to the second side of the first section; and
    a third section having a fifth side, an opposing sixth side, and a third length, the third length being a shortest distance between the fifth side and the sixth side, the fifth side being adjacent to the fourth side of the second section,
    wherein:
        the first length and the third length are substantially equal to each other;
        a width of the first section at a first point that is offset from the first side by a first offset amount is a second width;
        the first offset amount varies between zero and the first length;
        a width of the third section at a second point that is offset from the fifth side by the first offset amount is a third width;
        a first condition is true where a sum of the second width and the third width is equal to the first width; and
        the first condition is true for all values of the first offset amount.

2. The aperture of claim 1 wherein:
    the beam of electromagnetic radiation is a laser beam.

3. The aperture of claim 1 wherein:
    the first section is a first triangle having a first apex at the first side; and
    the third section is a second triangle having a second apex at the sixth side.

4. The aperture of claim 1 wherein:
    a metal overlay forms a window in an underlying layer of glass; and
    the window is the aperture.

5. The aperture of claim 4 wherein:
    the metal overlay comprises one of chromium, aluminum, and gold.

6. The aperture of claim 1 wherein:
    the first length is no greater than 1 mm.

7. A method of shaping a beam of electromagnetic radiation, the method comprising:
    providing an aperture; and
    causing the beam of electromagnetic radiation to pass through the aperture,
    wherein:
    the aperture comprises:
        a first section having a first side, an opposing second side, and a first length, the first length being a shortest distance between the first side and the second side;
        a second section having a third side, an opposing fourth side, a second length, and a first width, the second length being a shortest distance between the third side and the fourth side, the first width being substantially constant along all of the second length, and the third side being adjacent to the second side of the first section; and
        a third section having a fifth side, an opposing sixth side, and a third length, the third length being a shortest distance between the fifth side and the sixth side, the fifth side being adjacent to the fourth side of the second section,
        the first length and the third length are substantially equal to each other;
        a width of the first section at a first point that is offset from the first side by a first offset amount is a second width;
        the first offset amount varies between zero and the first length;
    a width of the third section at a second point that is offset from the fifth side by the first offset amount is a third width;
    a first condition is true where a sum of the second width and the third width is equal to the first width; and
    the first condition is true for all values of the first offset amount.

8. The method of claim 7 wherein:
    the beam of electromagnetic radiation is a laser beam.

9. The method of claim 8 wherein:
    the first section is a first triangle having a first apex at the first side; and
    the third section is a second triangle having a second apex at the sixth side.

10. The method of claim 9 wherein:
    the first length is no greater than 1 mm.

11. The method of claim 8 wherein:
    providing the aperture comprises providing a metal layer overlying a layer of glass;
    an opening in the metal layer exposes a window in the layer of glass; and
    the window is the aperture.

12. The method of claim 11 wherein:
providing the metal layer comprises providing a layer comprising one of chromium, aluminum, and gold.

13. A method of forming a pattern on a work piece, the method comprising:
placing a pattern mask over the work piece, the pattern mask containing the pattern that is to be formed;
placing an aperture over the pattern mask; and
placing the aperture, the pattern mask, and the work piece in a beam of electromagnetic radiation,
wherein:
the aperture comprises:
a first section having a first side, an opposing second side, and a first length, the first length being a shortest distance between the first side and the second side;
a second section having a third side, an opposing fourth side, a second length, and a first width, the second length being a shortest distance between the third side and the fourth side, the first width being substantially constant along all of the second length, and the third side being adjacent to the second side of the first section; and
a third section having a fifth side, an opposing sixth side, and a third length, the third length being a shortest distance between the fifth side and the sixth side, the fifth side being adjacent to the fourth side of the second section,
the first length and the third length are substantially equal to each other;
a width of the first section at a first point that is offset from the first side by a first offset amount is a second width;
the first offset amount varies between zero and the first length;
a width of the third section at a second point that is offset from the fifth side by the first offset amount is a third width;
a first condition is true where a sum of the second width and the third width is equal to the first width; and
the first condition is true for all values of the first offset amount.

14. The method of claim 13 wherein:
placing the aperture, the pattern mask, and the work piece in the beam of electromagnetic radiation comprises exposing the aperture, the pattern mask, and the work piece to a laser beam.

15. The method of claim 14 wherein:
the pattern is made up of a plurality of regions, each of which has a length substantially equal to the sum of the first length and the second length;
exposing the aperture, the pattern mask, and the work piece to the laser beam comprises positioning the aperture, the pattern mask, and the work piece such that only a first portion of the work piece passes through the laser beam in a first ablating event and only a second portion of the work piece passes through the laser beam in a second ablating event;
the first portion of the work piece comprises all of a first one of the plurality of regions and a section of a second one of the plurality of regions;
the section of the second one of the plurality of regions has a length equal to the first length plus an offset; and
the offset varies between zero and the first length.

16. The method of claim 15 wherein:
the first section is a first triangle having a first apex at the first side; and
the third section is a second triangle having a second apex at the sixth side.

17. The method of claim 16 wherein:
the first length is no greater than 1 mm.

18. The method of claim 17 wherein:
an intensity of the laser beam at the work piece is approximately 1 J/cm2.

19. The method of claim 15 wherein:
placing the aperture comprises:
attaching a metal layer to a layer of glass, where the metal layer contains an opening that exposes in the layer of glass a window that is the aperture.

20. The method of claim 19 wherein:
attaching the metal layer comprises attaching a layer comprising one of chromium, aluminum, and gold.

* * * * *